United States Patent
Bowers

(10) Patent No.: US 9,021,017 B2
(45) Date of Patent: Apr. 28, 2015

(54) CONFIGURING A PLURALITY OF DIVERSE DEVICES/SERVICES FROM AN ADAPTIVE CONFIGURATION CONTROL HYPER-SERVER APPARATUS

(75) Inventor: Jeremy Paul Bowers, Brighton, MI (US)

(73) Assignee: Barracuda Networks, Inc., Campbell, CA (US)

( * ) Notice: Subject to any disclaimer, the term of this patent is extended or adjusted under 35 U.S.C. 154(b) by 907 days.

(21) Appl. No.: 13/225,428

(22) Filed: Sep. 3, 2011

(65) Prior Publication Data

US 2013/0060836 A1    Mar. 7, 2013

(51) Int. Cl.
- *G06F 15/16* (2006.01)
- *G06F 15/173* (2006.01)
- *H04L 12/24* (2006.01)
- *H04L 29/08* (2006.01)
- *G06F 9/445* (2006.01)

(52) U.S. Cl.
CPC ........ *H04L 41/0286* (2013.01); *H04L 41/0813* (2013.01); *H04L 67/16* (2013.01); *H04L 67/36* (2013.01); *G06F 9/44505* (2013.01)

(58) Field of Classification Search
USPC .......................................................... 709/203
See application file for complete search history.

(56) References Cited

U.S. PATENT DOCUMENTS

| | | | | |
|---|---|---|---|---|
| 7,159,007 B2 * | | 1/2007 | Stawikowski | 709/202 |
| 7,440,959 B2 * | | 10/2008 | Elzbieta | 1/1 |
| 7,705,743 B2 * | | 4/2010 | Barone et al. | 340/682 |
| 7,823,189 B2 * | | 10/2010 | Patrick | 726/2 |
| 7,966,398 B2 * | | 6/2011 | Wiles, Jr. | 709/224 |
| 7,984,108 B2 * | | 7/2011 | Landis et al. | 709/215 |
| 8,412,813 B2 * | | 4/2013 | Carlson et al. | 709/224 |
| 8,473,720 B2 * | | 6/2013 | Liege | 712/220 |
| 8,489,797 B2 * | | 7/2013 | Hegde et al. | 710/316 |
| 8,516,095 B2 * | | 8/2013 | Eisener et al. | 709/223 |
| 8,549,114 B2 * | | 10/2013 | Reddy et al. | 709/221 |
| 8,713,583 B2 * | | 4/2014 | Peterson et al. | 719/319 |
| 8,762,965 B2 * | | 6/2014 | Alpern et al. | 717/138 |
| 8,825,816 B2 * | | 9/2014 | Deutsch et al. | 709/221 |
| 2011/0154231 A1 * | | 6/2011 | Cherdron et al. | 715/764 |
| 2012/0066632 A1 * | | 3/2012 | Sundermeyer et al. | 715/771 |
| 2012/0214451 A1 * | | 8/2012 | Richardson et al. | 455/414.1 |
| 2013/0124600 A1 * | | 5/2013 | Jaroker | 709/202 |
| 2013/0238504 A1 * | | 9/2013 | Gupta et al. | 705/44 |
| 2014/0108777 A1 * | | 4/2014 | Nilakantan et al. | 713/2 |
| 2014/0156824 A1 * | | 6/2014 | Biswas et al. | 709/223 |
| 2014/0222944 A1 * | | 8/2014 | Julia et al. | 709/208 |

* cited by examiner

*Primary Examiner* — Melvin H Pollack
(74) *Attorney, Agent, or Firm* — Duane Morris LLP; David T. Xue

(57) ABSTRACT

When each new device or service is installed into a network, a hyper-server reads a configuration description provided by the new device or service and adapts to provide a user interface for configuring its capabilities. A first server gathers descriptions of available commands and parameters from many diverse devices and services. A second server presents an administrator or operator with a control panel for one or many client devices. The panel presentation changes with respect to the devices or services selected. The hyper-server registers the capabilities of each device or service and transfers the commands and parameter settings to the appropriate device or service under configuration control.

15 Claims, 7 Drawing Sheets

CONFIGURING A PLURALITY OF DIVERSE DEVICES/SERVICES FROM AN ADAPTIVE CONFIGURATION CONTROL HYPER-SERVER APPARATUS

RELATED APPLICATIONS

None

BACKGROUND

From a software developer's point of view, the user interface of a stabilized or legacy product or service is not an attractive investment for redesign or modification. Thus it is common for customers to struggle with diverse ways to configure a mixture of systems having many common settings and parameters. Of course, next generation products have capabilities and controls unanticipated when designing the previous product line. Even products and service which serve different missions often have some common settings. Consider the various ways to reset time after a power failure in kitchen appliances, computers, phones, televisions, digital recording devices, alarm clocks, and motor vehicles.

This impacts time to market for new products as well as ease of adoption and maintenance for customers of many products.

Furthermore many products and services change their allowed commands and parameters from release to release and version to version. However, some parameters remain the same across versions and even across product families. It is tedious to individually configure multiple devices that differ in minor ways. It is also labor intensive to set the same or similar parameters for dissimilar products and services. Moreover, when new products or services are released, a gating factor is updating its user interface or making them consistent and easy to use with other products. What is needed is a way to set similar parameters in diverse products without learning different reinvented user interfaces for the same functionality. Furthermore similarities and dissimilarities among diverse products should be easily discoverable and, if desired, brought into coherence.

BRIEF DESCRIPTION OF FIGURES

The appended claims set forth the features of the invention with particularity. The invention, together with its advantages, may be best understood from the following detailed description taken in conjunction with the accompanying drawings of which:

SUMMARY OF THE INVENTION

An embodiment of the invention is a method of operating a configuration control hyper-server to present forms for selected devices and services to an administrator/operator and transmitting commands and settings to the devices and services.

In an embodiment a configuration control hyper-server and method for operation comprises:
 a register for command and parameter capabilities of the subject systems and services,
 a configuration server to receive command and parameter descriptions from each of a plurality of heterogeneous systems and services and to record these descriptions into the register,
 an administrator/operator interface server configured to present a navigation, search, and selection view port, and
 a control center to deliver commands, selections, and parameters from the administrator/operator interface server to the selected service or device under configuration control.

DETAILED DISCLOSURE OF EMBODIMENTS OF THE INVENTION

A command-parameter description language is provided by each instance of a device or service product to a configuration control hyper-server. The registration of the capabilities of each client device/service enables an administrator/operator server to present control panels which show common parameters spanning many instances. Each setting is forwarded to the clients for which they are appropriate. As new devices/services are added, the register is adapted to additional capabilities and the control panel automatically offer the new selections without special coding.

A plurality of diverse services and devices would benefit from centralized control and configuration. However the services and devices have a sparse matrix of features and settings. That is no one characteristic is common across the population but there is much overlap for any one characteristic across a plurality of services and devices. A rendering engine receives a user interface description from each member of the population and determines which subgroups or subsets diverge from other subgroups and subsets and which members of the population have common or equivalent parameters or settings. As individuals enter, leave, or are upgraded within the population, the rendering engine evolves by receiving the user interface description and changes the rendering accordingly. A configuration common to a plurality of the population may be changed and transmitted from the rendering engine to each of the relevant population. The entry of a new service or device into the queried population determines the display/control panel rather than being delayed until the control panel can be improved and tested.

Figure 1:
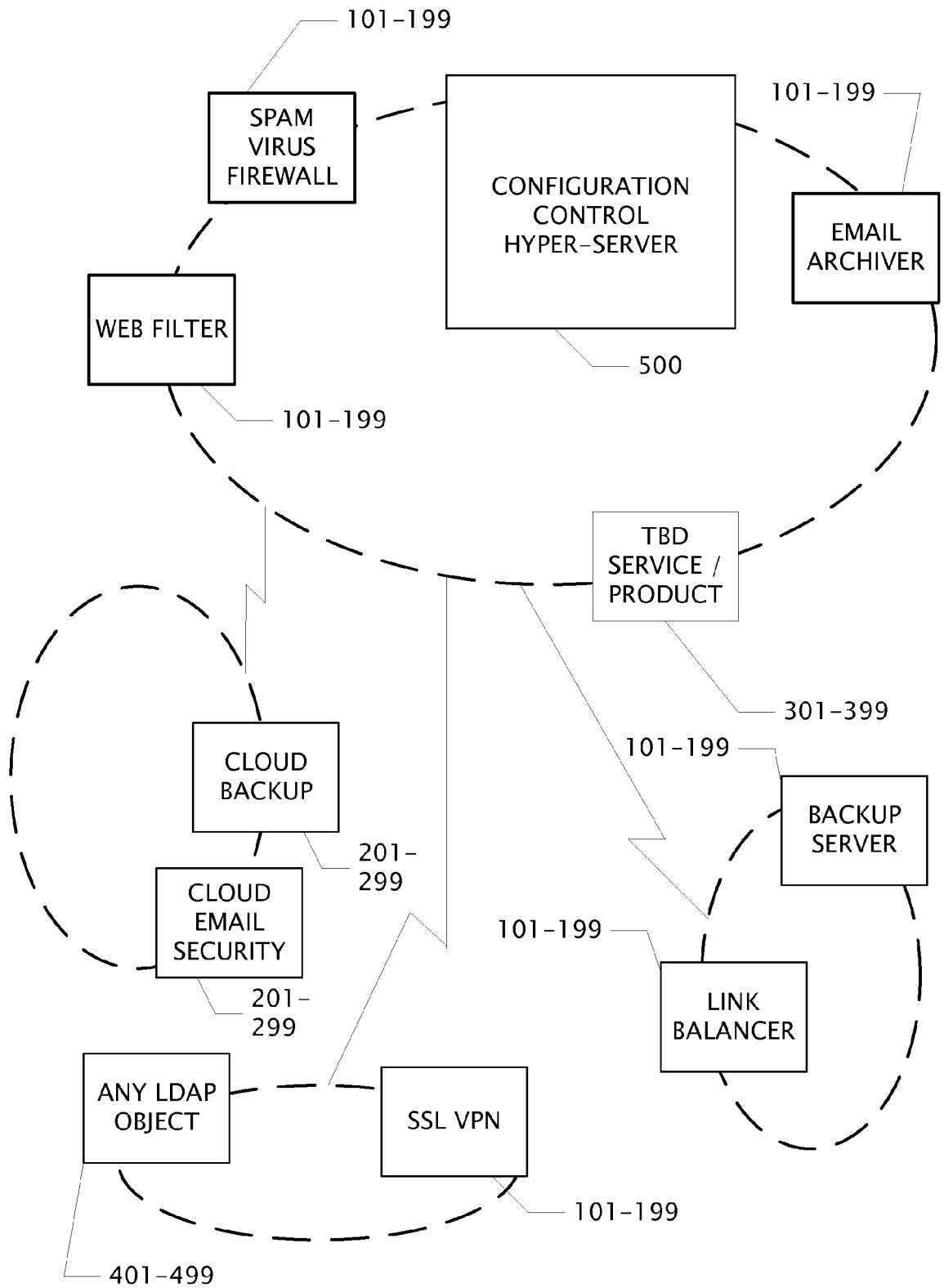
FIG. 1 is a schematic of a system in which the apparatus operates.
Figure 2:
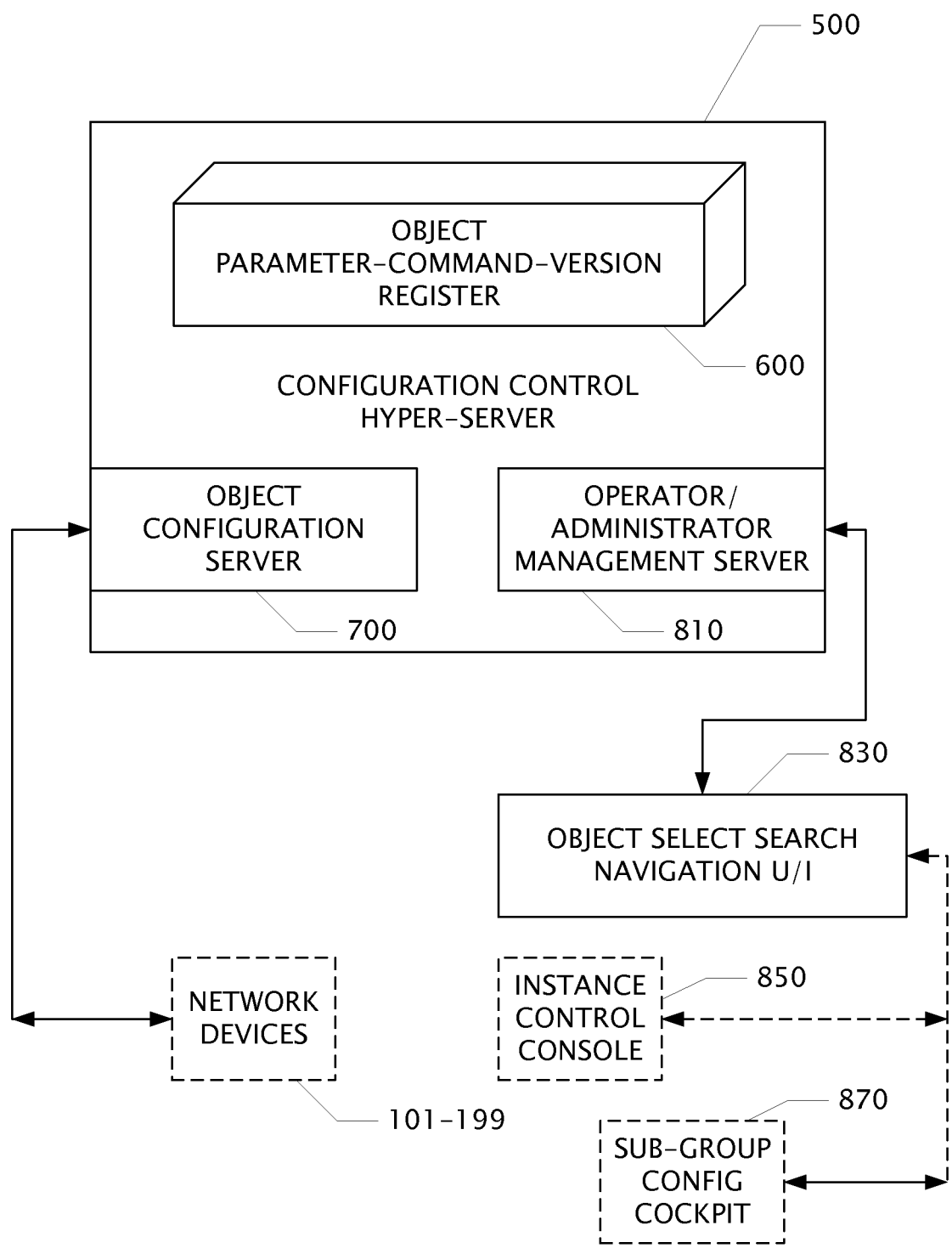
FIGS. 2-5 are block diagrams of components of an apparatus and data flows into and out of the apparatus.

Referring now to the figures, FIG. 2 illustrates one embodiment of the invention and its application. A configuration control hyper-server apparatus 500 comprises an object parameter-command-version register 600. Said register contains parameter-command description language capability messages transmitted by a plurality of network devices 101-199. The apparatus further comprises an object configuration server 700 coupled to the network devices and to the object parameter-command-version register. The apparatus further comprises an operator administrator management server 810 which is configured to present an object select search navigation user interface 830 from the contents of the object parameter-command-version register. Based on selections made by the administrator/operator, the operator/administrator management server presents panels for setting parameters or issuing commands to the selected device/service(s). In an embodiment a single instance for a control console is presented 850. In an embodiment a sub-group configuration cockpit is presented 870. As a result of setting parameters, one or more network devices 101-199 is configured by the object configuration server 700.

Figure 3:
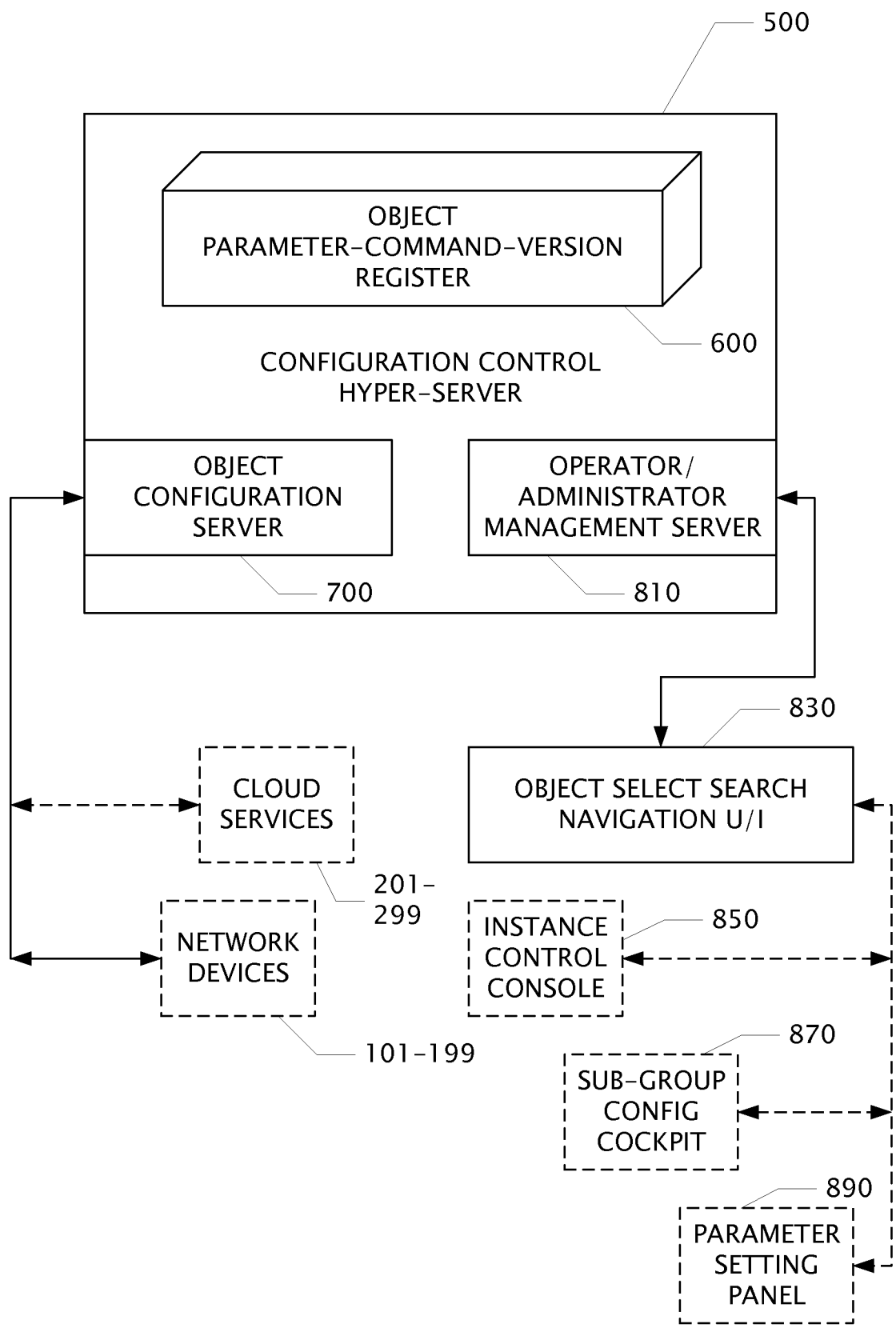

Referring now to FIG. 3. In an embodiment cloud services 201-299 also present a parameter-command description language which is stored into the object-parameter-command-version register. In an embodiment, a parameter setting panel 800 is provided to an operator/administrator who may select setting that apply to both devices and to services.

Figure 4:
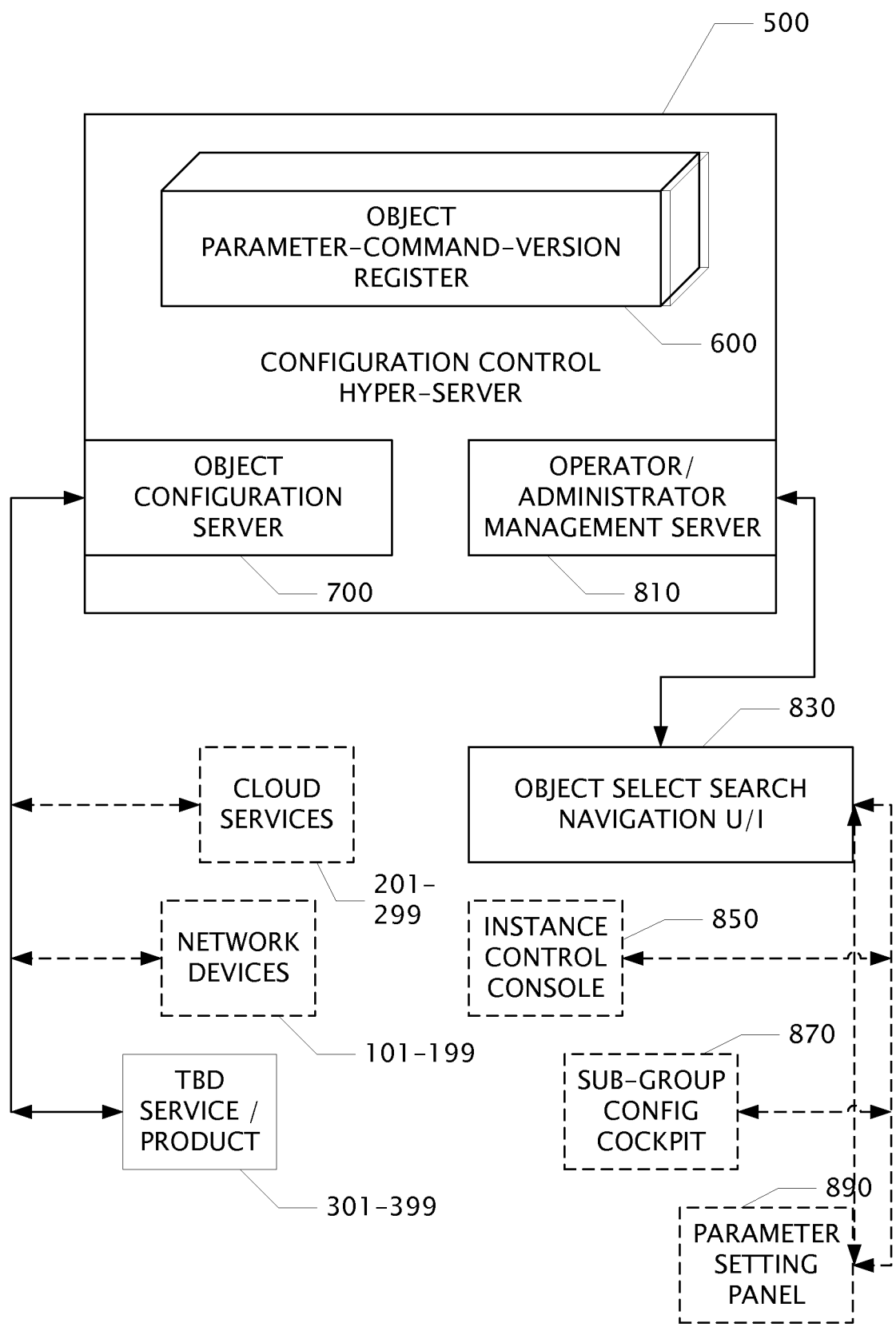

Referring now to FIG. 4, when a future service/product which is to be determined 301-399 is eventually installed and connected to the configuration control hyper-server, a user interface is automatically generated based on its parameter-command description language. This speeds adoption and installation and reduces the learning effort to add new products into a network. Note that the object parameter-command-version register 600 is modified to accommodate a new dimension when needed to include the capabilities of future products.

Figure 5:
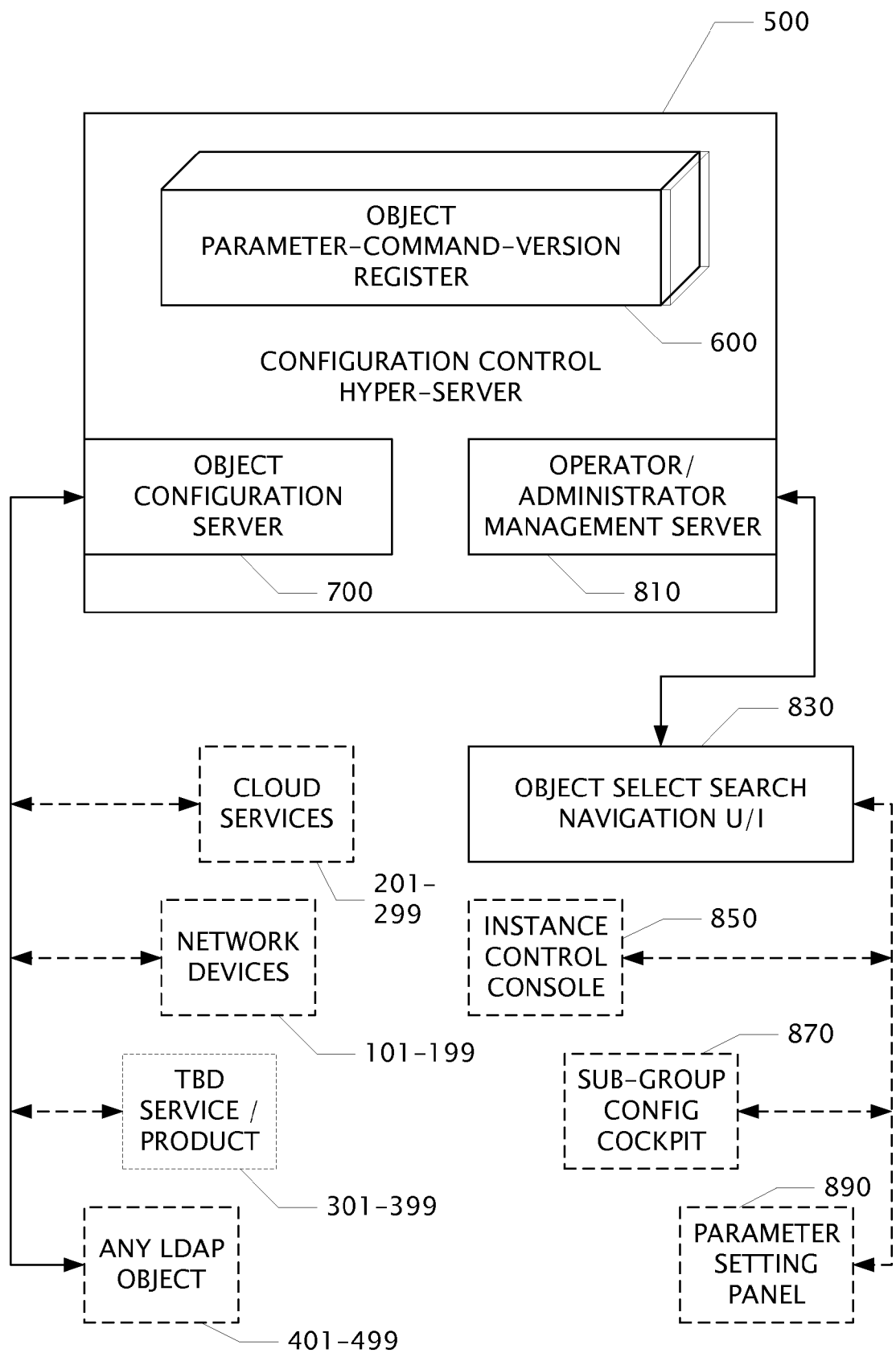
Figure 6:
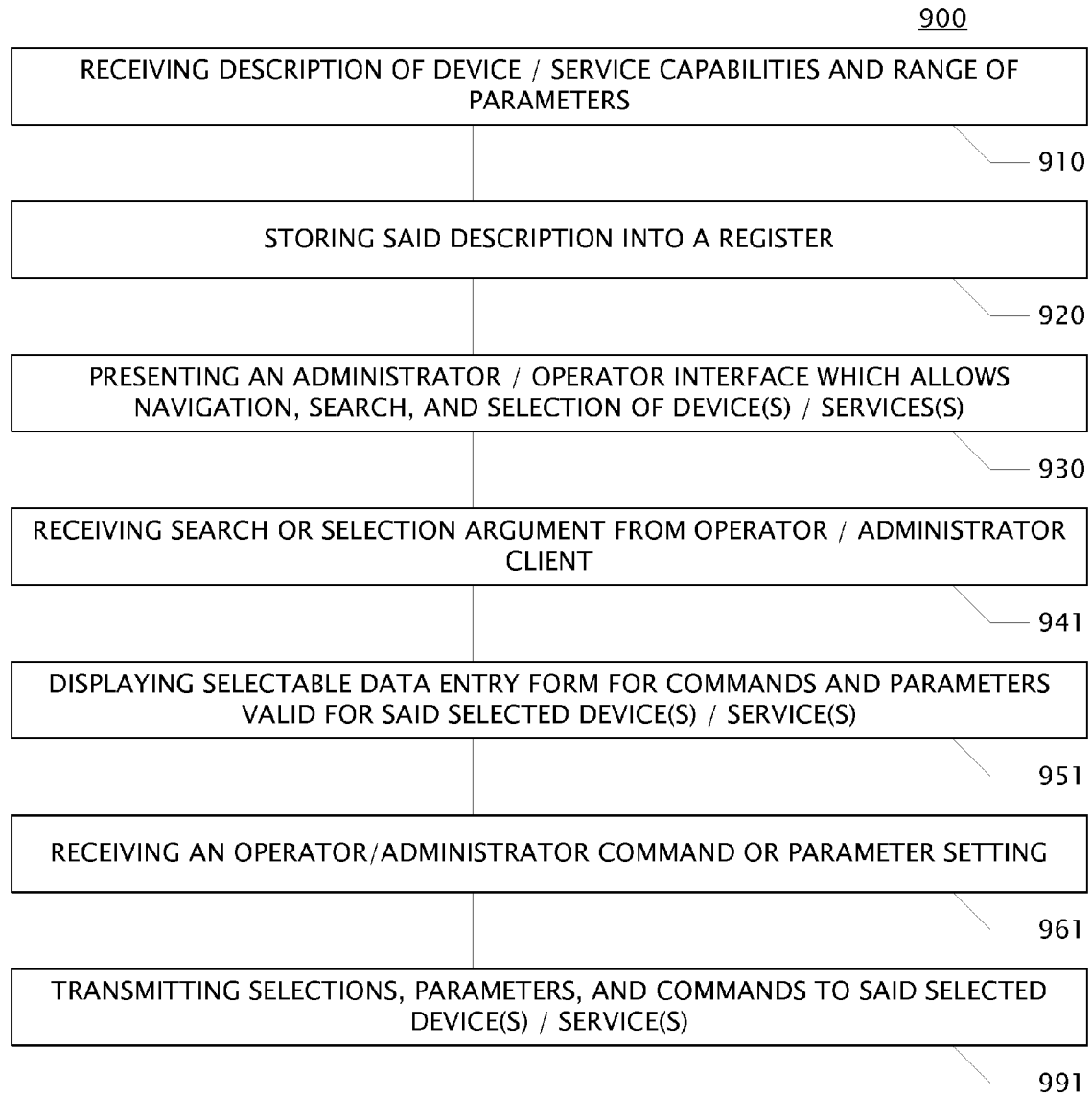
FIGS. 6-7 are flow charts of a method embodiments for controlling a processor based apparatus embodiment.
Figure 7:
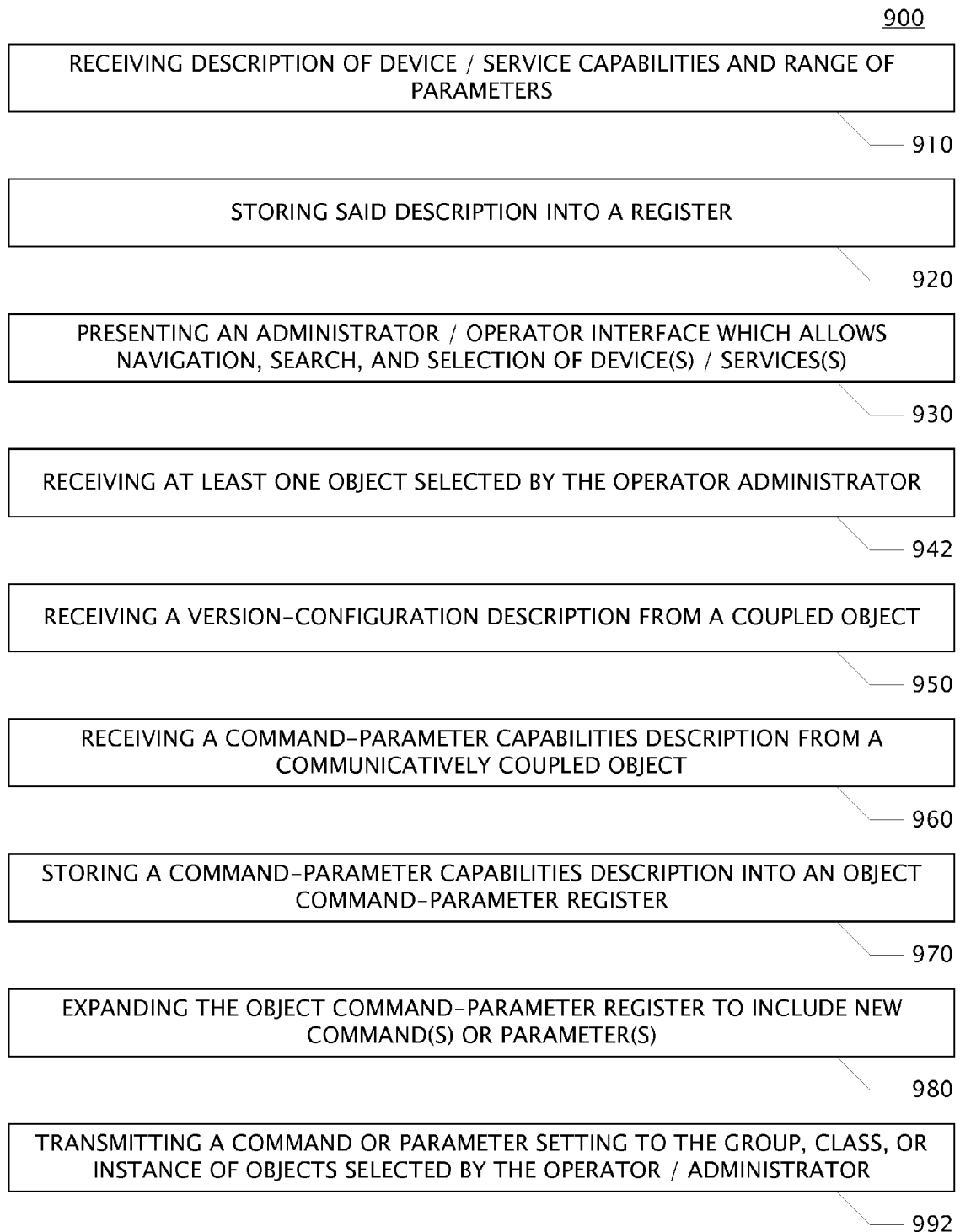

Referring to FIG. 5. Any LDAP object 401-499 may be added to the configuration control hyper-server for network administration.

In one embodiment the register is conceptually a sparse matrix of features, commands, and parameters that allows many versions for many device/services. Groups of device/services with similar parameters may be selected by the administrator/operator for selection or setting in one control panel.

One embodiment is a method for operating a configuration hyperserver apparatus, the method comprising:
 receiving a selection of services or devices which are represented in a register;
 determining which parameters, commands, or variables are common to all the selection,
 determining which of the selection belong to a subgroup with parameters, commands, or variables common to the subgroup,
 reading a command-parameter description of how each parameter, command, or variable may be displayed and set,
 determining a standard value for each parameter and identifying the devices which are variant from the standard value.
 presenting a user interface display the standard value and each variant,
 receiving and storing settings from the user interface, and configuring each selected device/service according to the settings.

In an embodiment, the standard value is the value with the highest percentage of all the settings in the selected members.

In an embodiment, the standard value is a unanimous value by all the settings for the parameter in the selected members.

In an embodiment, the standard value is the median value of all the settings for the parameter in the selected members.

In an embodiment, wherein the standard value is the most current setting of all settings for the parameter in the selected members.

In an embodiment, a method for operating an apparatus comprises:
 receiving heterogeneous configuration metadata for a member of the system,
 examining the metadata for similarities with other members in the system and
 configuring a video display to present the *minimal* interface to the user that allows the user to fully configure a slice or a section of configuration metadata that the user is viewing.

By minimal we mean that the display area is optimized by combining a user interface of redundant values for those parameters common to a selected set of members.

Elements of metadata shared among members of the currently-queried set are presented in a common interface, elements that are shared by only certain members of the set are presented to the user as only belonging to those members. (This may include identifying a particular controlled device as a sole source of a configuration element.)

When receiving configuration elements that common to multiple devices (such as an IP address), the method collects all the settings from the various devices visible in our current view and present them to the user in an interface that allows them to rapidly assess what configuration elements they have in common and what configuration elements are different. With scalar data, we present the user with a chosen configuration value, or possibly a blank one, and an interface element that allows the user to view the "exceptional" settings of any devices with different values.

The method used to choose the displayed configuration value is determined according to the specification of the user interface element in question. Embodiments of the method include (but are not limited to) the following:
 Plurality/threshold trumps (tastes great/less filling/other): The chosen configuration value will be the one shared by some chosen percentage >50% of the devices if such a setting exists, or a blank setting otherwise. This is a good default.
 Total agreement merge: The chosen configuration value will be the one shared by all if such a value exists, or blank otherwise. This is useful for things like clustering settings, where it is imperative to point out divergences in things like shared secrets.
 Non-blank merge: Configuration devices with blank or non-default values will be ignored, then one of the other algorithms will be applied to the result. (This is useful when we expect heterogeneous results and we want to use newer interfaces for the client devices, but not allow older versions to show exceptions due to not having the given setting at all.)
 Latest-value trumps: The latest value for a setting will be chosen. (This is useful for instance for values of system firmware updates, such that the exceptions show the user those devices which diverge from the latest value.

In an embodiment, a new weighting or preference may be set to improve usability.

For tabular data, in addition to recursively applying the previous method steps for scalars, we also face the possibility of only certain sets of devices even having a given row. In a exemplary non-limiting embodiment, a tabular display of exemptions for which email addresses are whitelisted, which includes an email address pattern, a human-readable comment set by the administrator, and a checkbox to indicate whether the exemption is currently applied, one scenario is where all the machines have a certain email address pattern, but different settings for their activation status. In that case, the method configures the apparatus to present an interface indicating that the row exists on all devices, but has different values using an other method.

It may also be the case that a particular single device has a unique parameter setting, in which case the method configures the apparatus to present an interface that indicates the device it belongs to, and provides an easy way of copying it to some or all other currently-viewable devices.

Finally, it may be the case that multiple devices share a given row, but not all the devices currently being viewed, and some of the settings for this row may vary between different devices. In this case the method configures the apparatus to both show the interface indicating that a given setting exists only on a subset of devices *and* show the divergences among the individual devices.

In an embodiment, the method identifies which rows are similar with metadata that indicates which elements of a row are a "key", which must be identical between devices to be considered a single row, and which are not, which are elements that may be identified as being part of the "same row" but may vary between machines.

It may also be pointed out that the method may be used on one single instance of an individual machine itself to view differences in configuration between versions of the same machine at a plurality of points in time.

Thus the user interface for display and configuration of a particular apparatus or service will not be constant. It will change as new devices are added to the environment with newer parameters and it will also change to reflect the user selection of devices out of the total membership in a system. Its values for each parameter may be displayed as standard or variant according to the other selected devices or services.

Means, embodiments, and structures

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated.

Any of the operations described herein that form part of the invention are useful machine operations. The invention also related to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a non-transitory computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion. Within this application, references to a computer readable medium mean any of well-known non-transitory tangible media.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

Conclusion

The invention is clearly distinguishable from conventional network management solutions by operating a configuration control hyper-server to present forms for selected devices and services to an administrator/operator and transmitting commands and settings to the devices and services.

Multiple versions, releases, and generations of products are supported by the same administrator/operator interface without delay. A configuration control hyper-server and method for operation comprises:

a register for command and parameter capabilities of the subject systems and services, a configuration server to receive command and parameter descriptions from each of a plurality of heterogeneous systems and services and to record these descriptions into the register, an administrator/operator interface server configured to present a navigation, search, and selection view port, and a control center to deliver commands, selections, and parameters from the administrator/operator interface server to the selected service or device under configuration control.

What is claimed is:

1. A configuration control server, comprising:
   a register configured to store user interface descriptions of systems and services;
   a configuration server configured to receive a user interface description from each of a plurality of heterogeneous systems and services and to record these user interface descriptions into the register,
   an administrator management server configured to
      automatically generate an object selection and navigation user interface based on user interface descriptions of one or more systems and services when the systems and services are newly installed and connected to the configuration server, wherein the user interface allows for navigation, search, and selection of the systems and services;
      present the object selection and navigation user interface from the administrator management server to the systems and services.

2. A method for operating a configuration control server comprising:
   receiving from each of a plurality of heterogeneous systems and services under configuration control a description of its user interface;
   storing said description into a register,
   automatically generating an object selection and navigation user interface based on user interface descriptions of one or more systems and services when the systems and services are newly installed, wherein the user interface allows for navigation, search, and selection of the systems and services;
   presenting the object selection and navigation user interface to the systems and services.

3. The method of claim 2 further comprising:
   expanding the register to accommodate the user interface descriptions of the newly installed systems and services.

4. A method for operating a configuration server apparatus, the method comprising:
   receiving a selection of services or devices which are represented in a register;

determining which parameters, commands, or variables are common to user interfaces of the selection of the services or devices;

determining which of the selection of the services or devices belong to a subgroup with parameters, commands, or variables common to the subgroup, reading user interface descriptions of how each parameter, command, or variable is displayed and set by the services or devices;

determining a standard value for the parameters and identifying the parameters which are variant from the standard value;

automatically generating and presenting a user interface displaying the standard value and the variant of based on the user interface descriptions for the services or devices belong to the subgroup.

5. The method of claim 4 wherein the standard value is the value with the highest percentage of all the settings in the selected members.

6. The method of claim 4 wherein the standard value is a unanimous value by all the settings for the parameter in the selected members.

7. The method of claim 4 wherein the standard value is the median value of all the settings for the parameter in the selected members.

8. The method of claim 4 wherein the standard value is the most current setting of all settings for the parameter in the selected members.

9. The configuration control server of claim 1, wherein:
display and control panel of the user interface is determined by the user interface descriptions of the systems and services.

10. The configuration control server of claim 1, wherein:
display and control panel of the user interface reflects changes in the user interfaces of the systems and services.

11. The configuration control server of claim 10, wherein:
display and control panel of the user interface is dynamically updated to be consistent with the user interface descriptions of the systems and services when the systems and services are changed.

12. The configuration control server of claim 1, wherein:
the user interface descriptions are metadata of the user interface of the systems and services.

13. The configuration control server of claim 1, wherein:
the metadata is dynamically updated over time by clients of the systems and services.

14. The configuration control server of claim 1, wherein:
the administrator management server is further configured to
select a group of the systems and services having common user interface descriptions; and
generate and present one user interface for the group of the systems and services based on the user interface descriptions.

15. The configuration control server of claim 14, wherein:
portions of the user interface that are shared by only certain members of the group are presented only to those members of the group.

* * * * *